United States Patent
Lo et al.

(10) Patent No.: US 7,441,099 B2
(45) Date of Patent: Oct. 21, 2008

(54) CONFIGURABLE SIMD PROCESSOR INSTRUCTION SPECIFYING INDEX TO LUT STORING INFORMATION FOR DIFFERENT OPERATION AND MEMORY LOCATION FOR EACH PROCESSING UNIT

(75) Inventors: Wing Yee Lo, Hong Kong (CN); Simon Moy, Los Altos, CA (US)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 11/538,070

(22) Filed: Oct. 3, 2006

(65) Prior Publication Data

US 2008/0082797 A1    Apr. 3, 2008

(51) Int. Cl.
*G06F 15/80*    (2006.01)

(52) U.S. Cl. ........................................ 712/22; 712/208

(58) Field of Classification Search ........................ None
See application file for complete search history.

(56) References Cited

U.S. PATENT DOCUMENTS

| 4,992,933 | A |   | 2/1991 | Taylor |
|---|---|---|---|---|
| 5,526,501 | A | * | 6/1996 | Shams ......................... 711/217 |
| 5,680,597 | A |   | 10/1997 | Kumar et al. |
| 6,145,072 | A | * | 11/2000 | Shams et al. .................. 712/22 |
| 6,665,790 | B1 | * | 12/2003 | Glossner et al. ................ 712/4 |
| 6,948,045 | B2 |   | 9/2005 | Kirsch |
| 7,257,695 | B2 | * | 8/2007 | Jiang et al. .................... 712/22 |
| 2003/0221089 | A1 | * | 11/2003 | Spracklen ................... 712/221 |
| 2004/0015677 | A1 | * | 1/2004 | Moreno et al. ................ 712/22 |

* cited by examiner

*Primary Examiner*—Kenneth S Kim
(74) *Attorney, Agent, or Firm*—Troutman Sanders LLP; Ryan A. Schneider; James Hunt Yancey, Jr.

(57) ABSTRACT

Methods and apparatuses for processing a Configurable Single-Instruction-Multiple-Data (CSIMD) instruction are disclosed. In the method, a lookup table (LUT) storing information is provided to support random access of memory locations associated with a plurality of processing elements (PEs) and to perform instruction variances by the PEs. A CSIMD instruction is received, comprising a command and an index to the lookup table (LUT), to be executed by the PEs. The command of the received CSIMD instruction is executed in parallel differently by the PEs using the LUT index to randomly access the memory locations.

34 Claims, 6 Drawing Sheets

CONFIGURABLE SIMD PROCESSOR INSTRUCTION SPECIFYING INDEX TO LUT STORING INFORMATION FOR DIFFERENT OPERATION AND MEMORY LOCATION FOR EACH PROCESSING UNIT

TECHNICAL FIELD

The present invention relates generally to parallel processors and more particularly to Single Execution Multiple Data (SIMD) processors.

BACKGROUND

Parallel processing generally refers to the concept of increasing the speed of execution of a program by segregating the program into multiple segments, which can be executed simultaneously across multiple processors. Depending on the type of application, different parallel processor architectures provide varying results and require different program segmentation. For example, a program may be dissected into components that, whilst being executed concurrently, are essentially executed independently of one another. This type of parallel processing is known as Multiple Input stream, Multiple Output stream (MIMD). Such an approach provides flexibility, but at the expense of increased complications due to race conditions, in which timing discrepancies and data dependency between processing units of the MIMD processor may cause the executing program components to lose their correct sequence, resulting in interruption of the execution. An alternative genre of parallel processors is known as a Single Instruction stream, Multiple Data stream (SIMD). This type of parallel processing unit is particularly useful when performing the same execution across a large amount of data (for example, image processing), where an operation may be uniformly applied across all, or a substantial segment, of the pixels of the image.

FIG. 1 illustrates a SIMD unit 100 according to an existing configuration. The SIMD unit 100 comprises several processing elements (PEs) 110a-110n, which operate in parallel. Also shown are respective memory banks 120a-120n, which are memory stacks in the illustrated example. Each memory bank comprises a number of memory addresses, address 0, address 1, . . . , address M. The PEs 110 may be any execution engine, such as an arithmetic processor, that performs commands such as addition, subtraction, multiplication, and division, for example. Alternatively, the PEs 110 may equally be logical and bit manipulation units, which perform operations such as ADD, OR, EXCLUSIVE-OR, etc. Each processing element 110 can receive multiple data inputs from and write data to a respective memory bank 120 via respective read and write operations.

FIG. 2 shows an example of a SIMD instruction 200 that can be executed by the SIMD unit 100 of FIG. 1. The instruction 200 comprises several components 210-250. The composition and sequencing of the components 210-250 varies depending on the implementation of the SIMD unit 100. In the example, the instruction 200 comprises a command instruction (CMD) component 210, data source components 220, 230 (SRC0 and SRC1, respectively), a destination address component 240 (DST) and a miscellaneous control component 250 (MISC).

The CMD component 210 indicates the type of command to be executed, and the SCR0 component 220 and SRC1 component 230 provide the source addresses of the data in the respective memory banks, on which the CMD command is to be executed. The DST component 240 gives the destination address of data in the respective memory banks, where the data result of performing the CMD command on the data sources SCR0 and SCR1, is to be written to. The MISC component 250 provides further instruction variances for the PEs to perform, such as whether the executed CMD command result is taken absolute or shifted before the write process or whether the source data is the source component (SRC0 or SCR1) itself instead of from a memory bank.

FIG. 3 illustrates a method 300 for executing an instruction such as that shown in FIG. 2, on a SIMD unit such as the arrangement 100 of FIG. 1. In step 310, a SIMD instruction (200) is received by the SIMD unit. The instruction may be parsed to separate the instruction components. Alternatively, the instruction may be parsed before being provided to the SIMD unit. In step 320, the PEs receive the instruction command. In step 330, the PEs retrieve data from their respective memory banks. The data in the memory bank addresses indicated in the SRC0 and SRC1 components of the instruction are retrieved from each of the respective memory banks. The PEs read the respective source data.

In step 340, the PEs execute the instruction. That is, the command instruction is executed by each of the PEs. The MISC control information is passed to PEs. The different executions of instruction variances are controlled by different MISC control information settings. All the PEs must execute the same operation in any execution cycle. In step 350, the result is written to the destination address. Each of the PEs writes to the memory address indicated by the DST component of the instruction (200 of FIG. 2), in each of the PEs' respective memory banks. Disadvantageously, the above SIMD unit configuration of FIGS. 1 to 3 is restricted to reading and writing to a memory bank associated with a respective PE only. Further, each PE must execute exactly the same instruction variance on the retrieved data.

A need therefore exists for a SIMD unit that provides greater flexibility over the above arrangements.

SUMMARY

In accordance with an aspect of the invention, there is provided a method of processing a Configurable Single-Instruction-Multiple-Data (CSIMD) instruction. The method comprises the steps of: providing a lookup table (LUT) storing information to support random access of memory locations associated with a plurality of processing elements (PEs) and to perform instruction variances by the PEs; receiving a CSIMD instruction, comprising a command and an index to the lookup table (LUT), to be executed by the PEs; and executing in parallel differently the command of the received CSIMD instruction by the PEs using the LUT index to randomly access the memory locations.

The information stored in the LUT may depend on application needs.

The information stored in the LUT may comprise instruction variances, random source data retrieval from the memory locations, and random destination data write-back to the memory locations. Data retrieval from and data write-back to memory locations may be effected by specifying address and bank information.

The PEs may perform instruction variances, random source data retrieval and random destination write back according to the LUT index.

A LUT row pointed to by the LUT index may further comprise information about at least some source data for the PEs to be read from respective memory locations associated with the PEs. A LUT row pointed to by the LUT index may comprise information about destination data for the PEs to be written to respective memory locations associated with the PEs.

The method may further comprise the step of writing the results of each command executed by the PEs to respective destination memory locations. The CSIMD instruction may comprise the destination memory locations.

The LUT comprises memory addresses in respective rows accessible using the LUT index to provide random access of source data stored in the memory locations.

Source and/or destination data locations, which can comprise row addresses and column banks, in the LUT may be provided to a random data access control (RDAC) unit. The RDAC unit may read data from the source data location and transfer the data to a respective PE. The RDAC unit may transfer data from respective PEs and write to the destination data location.

The method according may further comprise the step of providing at least one of the PEs with MISC control information in the LUT to allow each PE to execute the command differently.

The memory locations may comprise row addresses and column banks.

The CSIMD instruction may further comprise one or more of source data locations, destination data locations and MISC control information.

In accordance with a further aspect of the invention, there is provided an apparatus of processing a Configurable Single-Instruction-Multiple-Data (CSIMD) instruction. The apparatus comprises:

a plurality of processing elements (PEs);

a lookup table (LUT) storing information to support random access of memory locations associated with the processing elements (PEs) and to perform instruction variances by the PEs;

the PEs receiving a CSIMD instruction, comprising a command and an index to the lookup table (LUT), to be executed by the PEs, and the PEs executing in parallel differently the command of the received CSIMD instruction using the LUT index to randomly access the memory locations.

The information stored in the LUT may depend on application needs.

The information stored in the LUT may comprise instruction variances, random source data retrieval from the memory locations, and random destination data write-back to the memory locations.

Data retrieval from and data write-back to memory locations may be effected by specifying row address and column bank information.

The PEs may perform instruction variances, random source data retrieval and random destination write back dependent on the LUT index.

A LUT row pointed to by the LUT index may further comprise information about at least some source data for the PEs to be read from respective memory locations associated with the PEs.

A LUT row pointed to by the LUT index may comprise information about destination data for the PEs to be written to respective memory locations associated with the PEs.

The apparatus may further comprise means for writing the results of each command executed by the PEs to respective destination memory locations.

The CSIMD instruction may comprise the destination memory locations.

The LUT may comprise memory addresses and/or banks, or rows and columns, accessible using said LUT index to provide random access of source data stored in said memory locations.

The apparatus may further comprise a random data access control (RDAC) unit that is provided at least one of the source and destination data locations, which can be row addresses and column banks, in the LUT. The RDAC unit may read data from the source data location and transfer the data to a respective PE. The RDAC unit may transfer data from respective PEs and write to the destination data location.

At least one of the PEs may be provided with MISC control information in LUT to allow each PE to execute the command differently.

The addresses of said memory locations comprise row addresses and column banks.

The CSIMD instruction may further comprise one or more of source data locations, destination data locations and MISC control information.

BRIEF DESCRIPTION OF THE DRAWINGS

Embodiments of the invention are described hereinafter with reference to the drawings, in which.

DETAILED DESCRIPTION

Figure 1:
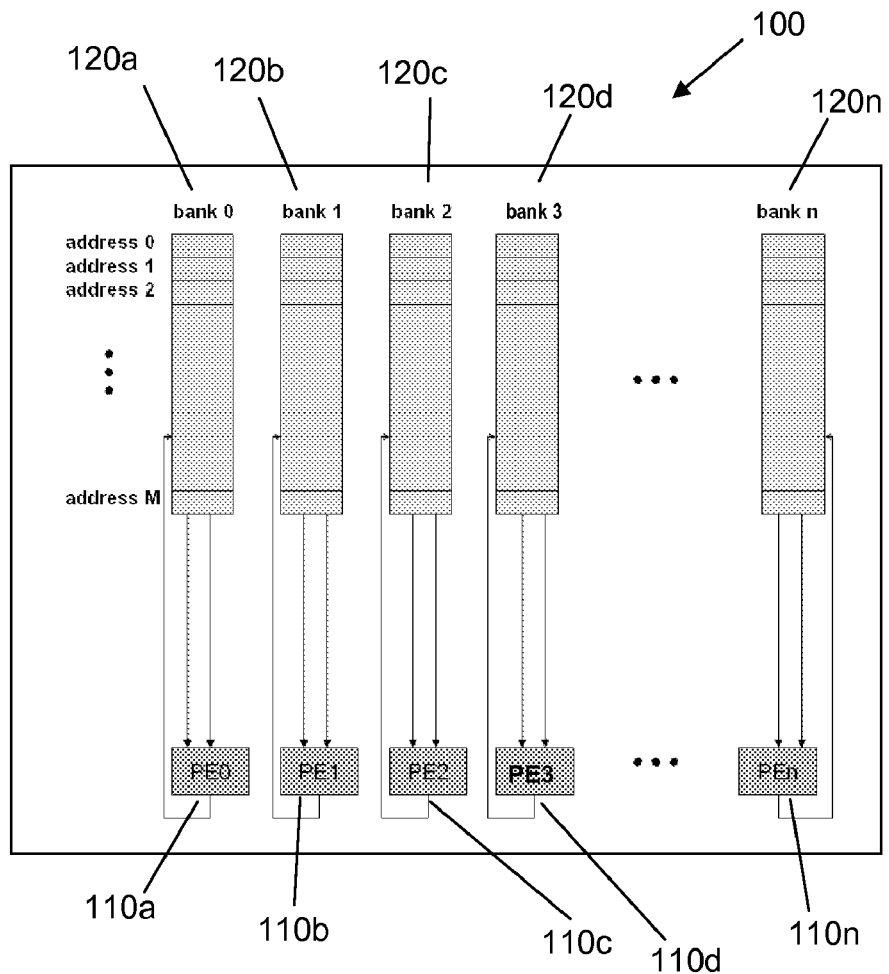
FIG. 1 is a block diagram shows an existing Single Instruction, Multiple Data (SIMD) unit.
Figure 2:
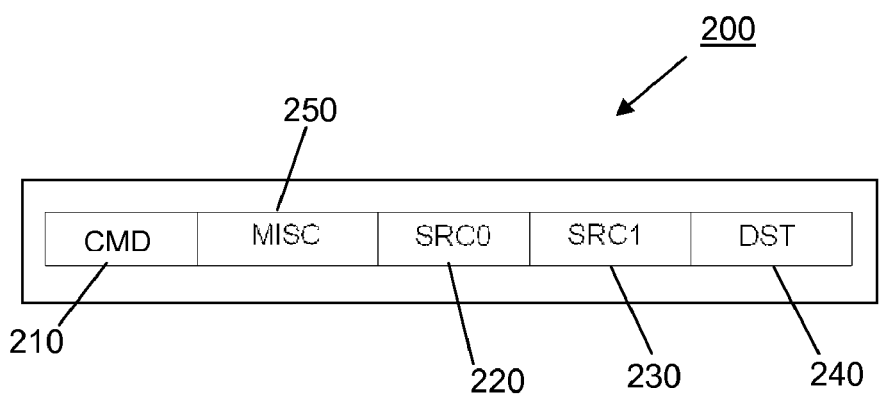
FIG. 2 is a block diagram illustrating an example of an instruction for use by the SIMD unit shown in FIG. 1.
Figure 3:
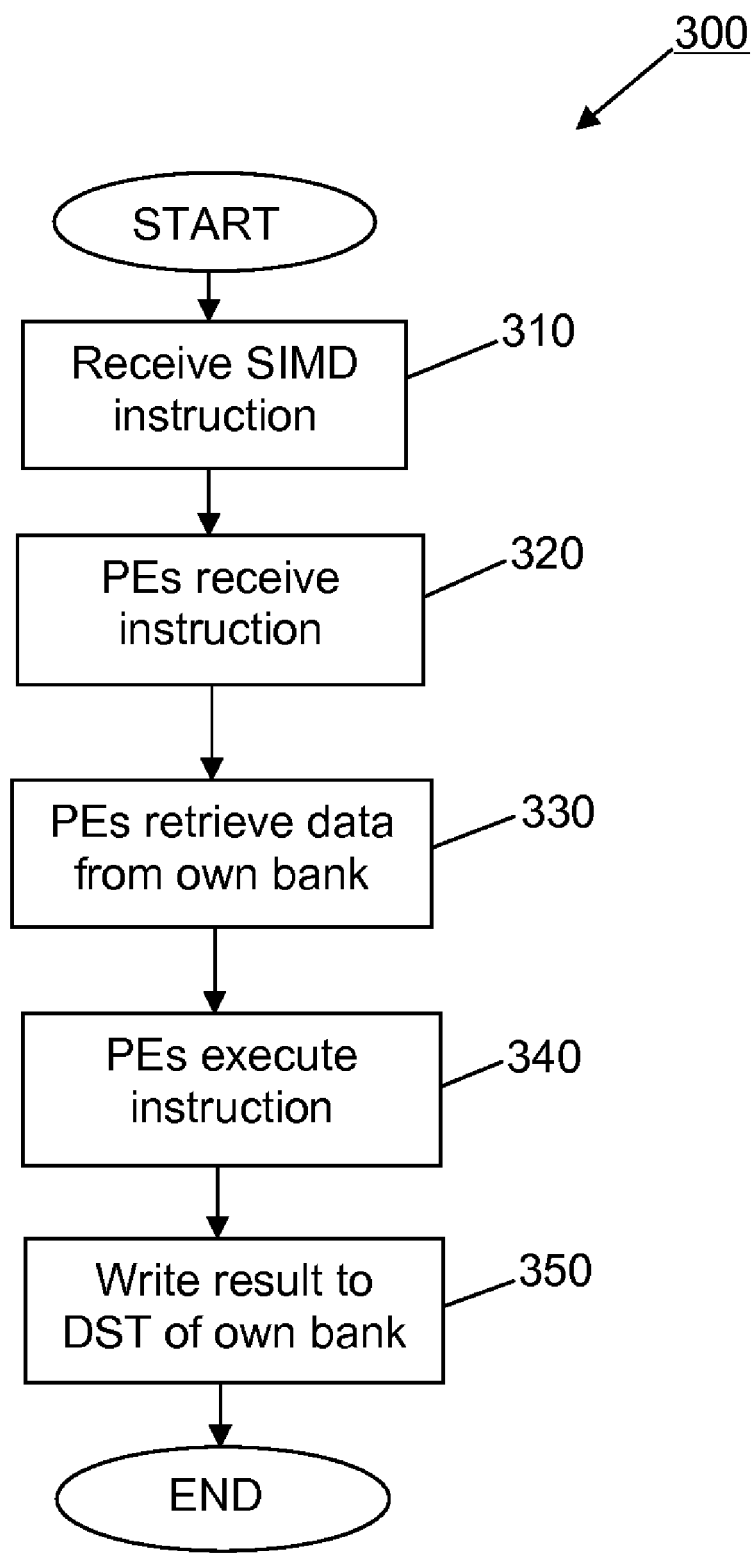
FIG. 3 is a high-level flow diagram depicting a method of executing the SIMD instruction of FIG. 2 by the SIMD unit of FIG. 1.

Methods and apparatuses for processing a Configurable Single-Instruction-Multiple-Data (CSIMD) instruction are described hereinafter. In the following description, numerous specific details, including lookup table structures, indices, pointers, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same or like reference numerals, those steps and/or features have for the purposes of this description the same function(s) or operation(s), unless the contrary intention appears.

In the context of this specification, the word "comprising" has an open-ended, non-exclusive meaning: "including principally, but not necessarily solely", but neither "consisting essentially of" nor "consisting only of". Variances of the word "comprising", such as "comprise" and "comprises", have corresponding meanings.

1. Configurable SIMD Unit

Figure 4:
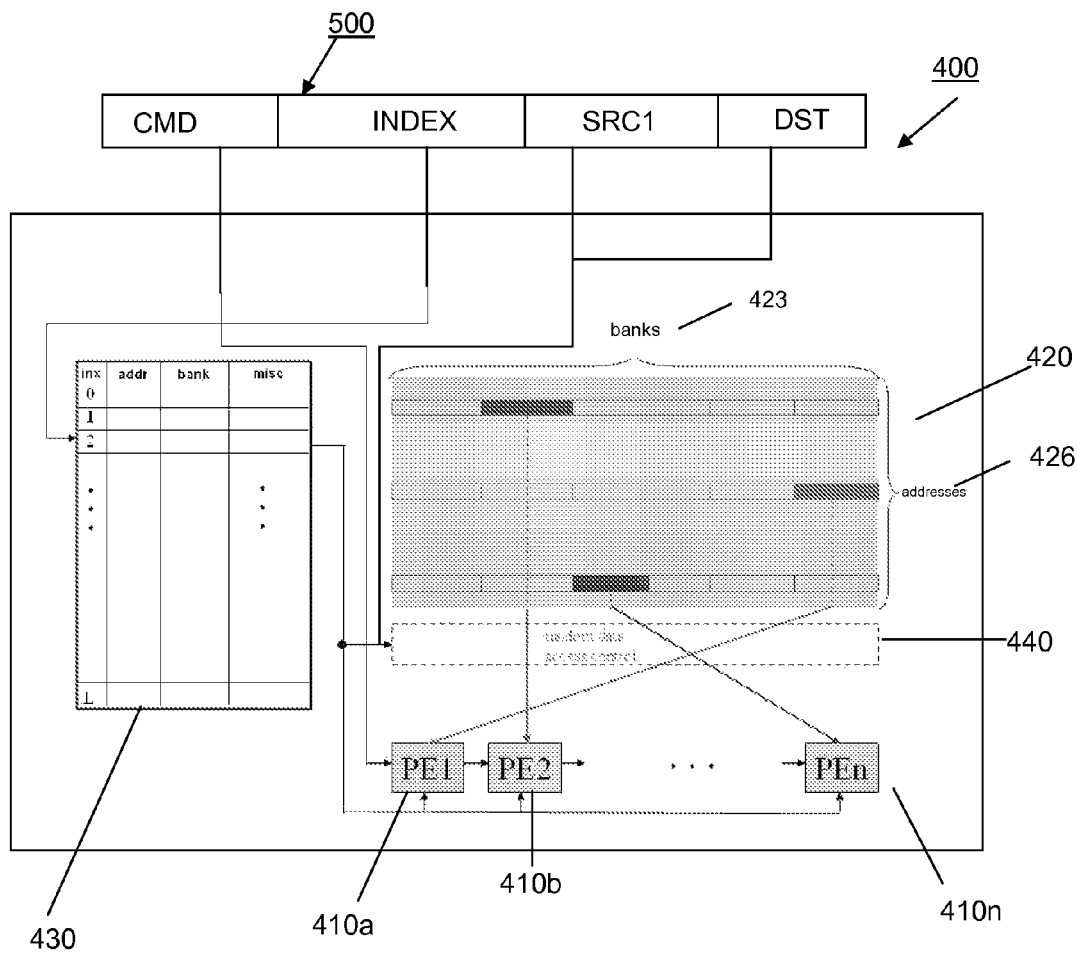
FIG. 4 is a schematic block diagram illustrating a Configurable SIMD (CSIMD) unit in accordance with an embodiment of the invention.

FIG. 4 schematically illustrates a Configurable SIMD (CSIMD) unit 400 and also shows a CSIMD instruction 500. The CSIMD unit 400 comprises a number of PEs 410a-410n arranged in parallel, which can simultaneously execute an instruction 500 received by the PEs 410. The PEs 410 have inputs for receiving further information about processing the different command variances and different random source data locations and for receiving source data on which the command is to be performed. There are many ways to implement command variances. For example but not limited to the example, assume there are 8 PEs and the application must perform an addition (e.g., CMD is "CSIMD-ADD", operation is "result=source0+source1"). However, some of PEs are required to perform slightly different operations, like "result= (source0>>2)+source1". If so, one implementation can use 8-bit data, say, "11011000", each bit associated with one PE, to do this variance. The bit value of "1" can represent the former normal ADD, while "0" represents the later special ADD. In this notation, PE0, PE1, PE3 and PE4 perform the normal ADD, while the other PEs perform the special ADD. In this example, the value "11011000" can be programmed into the MISC column of the LUT. In the CSIMD unit 400, the further information from a LUT 430 is not only used to get the source data from random memory locations, but is used to allow minor dissimilar operation(s) among the PEs 410 upon receiving the same instruction command CMD 510. The PEs 410 comprise at least one output for transmitting, for example, the data result of an executed instruction.

A memory block 420 is provided in the illustrated CSIMD unit 400. The memory block 420 comprises a number of register file (RF) memory banks 423 (columns), each bank 423 having a number of addresses 426 (rows). Each address 426 may have data read therefrom, or may have data written to that address 426. Each memory bank 423 is designated or associated with a particular PE 410. The PE 410 may read from or write to an address 426 in the respective designated memory bank or any bank dependent on application requirements. Different applications may need different things, depending on how an application is implemented. In one application, for example, sub-pixel interpolation in a video compression algorithm, can be implemented by CSIMD, requires source data from a different memory bank for each PE.

Figure 5:
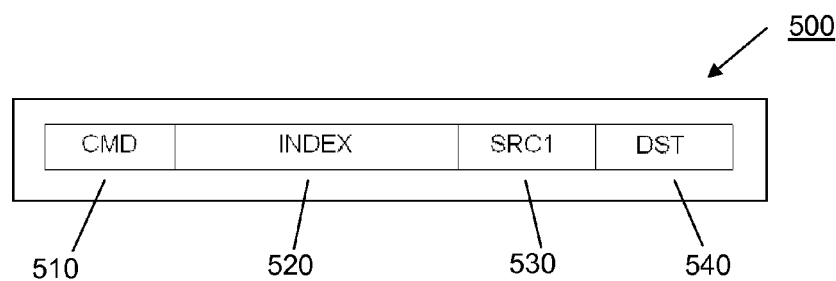
FIG. 5 is block diagram depicting an example of an instruction for use by the CSIMD unit of FIG. 4.

The CSIMD unit 400 further comprises a Look-Up Table (LUT) 430 organised into rows and columns. One row of the LUT 430 is referenced by a LUT index, which is contained in the CSIMD instruction 500. The index is used to identify a particular row of the LUT 430. The size and the content of the LUT 430 may vary depending upon the application for which the CSIMD unit 400 is designed. For example, in the illustrated CSIMD unit 400, the LUT 430 comprises an address (ADDR) column, a bank (BANK) column, and a miscellaneous (MISC) column. The ADDR and BANK information relates to source and/or destination data locations in the memory block 420. The LUT 430 in FIG. 4 is only an example of how it can be designed. The organization of the LUT 430 shown in FIG. 4 may be varied without departing from the scope and spirit of the invention. Both source data (SCR0 and SCR1) can be retrieved from and written to any address of any memory bank 423. In this case, the LUT 430 may have addr0, addr1, addr2, bank0, bank1 and bank2 columns for SCR0, SCR1 and result respectively. The CSIMD instruction 500 of FIG. 5 is an example only. The CSIMD instruction 500 can comprise only one source data location with more MISC control information, or three source data locations with no MISC control information, for example. The organisation and content of the CSIMD instruction 500 depends on the application needs. The LUT content can be loaded once before the application starts or be kept updated from time to time during the application execution.

The MISC column of the LUT 430 provides further information about how to process the command variances executed by the PEs 410. In the CSIMD unit 400, the further information from the LUT 430 is not only used to process the result of the executed command, but to allow dissimilar operations amongst the PEs 410 upon receiving the same instruction command CMD 510. For example, the MISC control information may indicate if the data result of the command execution is to be taken absolutely, or shifted, before the data result is written to a location in the memory block 420. The LUT 430 is configured to transfer data to each of the PEs 410 and to a Random Data Access Control (RDAC) unit 440 (indicated by dashed lines). For example, the MISC column in the LUT 430 may have N bits, each of which is passed to the PEs 410. The data bit "1" may indicate a specific operation is to be executed, while data bit "0" may indicate another specific operation is to be executed.

The RDAC unit 440 is an interface that controls data being read from and/or written to the memory locations of the memory block 420 by the PEs 410 according to the instruction components and additional information from the LUT 430. For example, the addr and bank columns in the LUT 430 comprise N pairs of data, each of which is the memory row and the memory bank from which each PE should get, for example, the source data 0 (SRC0). With this information, the RDAC unit 440 knows how to route the source data from each memory (RF) location to the appropriate PE. The RDAC unit 440 comprises a row control unit and a column control unit, which drive control signals to the memory block 420 so that data is retrieved from or written to corresponding row and bank. The RDAC unit 440 is memory control unit and may be called a memory controller.

2. CSIMD Instruction

FIG. 5 illustrates an example of an instruction 500 that may be executed on a CSIMD unit 400 such as that shown in FIG. 4. The CSIMD_instruction 500 comprises several components, such as a command instruction (CMD) component 510, which indicates the type of command to be executed by the PEs 410. The CMD component 510 is provided as an input to the PEs 410. An index component 520 (INDEX) indicates the row of the LUT 430, which is to be accessed. The LUT row has information about a first (SRC0) memory location, which is either a row and column, or an address and bank (i.e. row=address, column=bank) containing data to be read from and provided to a PE 410, and information indicating how the PEs 410 are executed differently (MISC). The LUT index 520 is provided as an input to the LUT 430. The output of the LUT 430 is provided to the RDAC unit 440 and to the PEs 410. The CSIMD instruction 500 also comprises a source data (SCR1) component 530, which specifies a second memory location having data to be read from and provided to a PE 410. The second memory location can be found in the designated memory bank of the respective PE 410. The SRC1 component 530 is provided as input to the RDAC unit 440. The CSIMD instruction 500 further comprises a destination data (DST) component 540 indicating the destination location, which can be destination address of the designated memory bank, to which the result of the executed command is to be written. The DST component 540 is provided as input to the RDAC unit 440.

Figure 6:
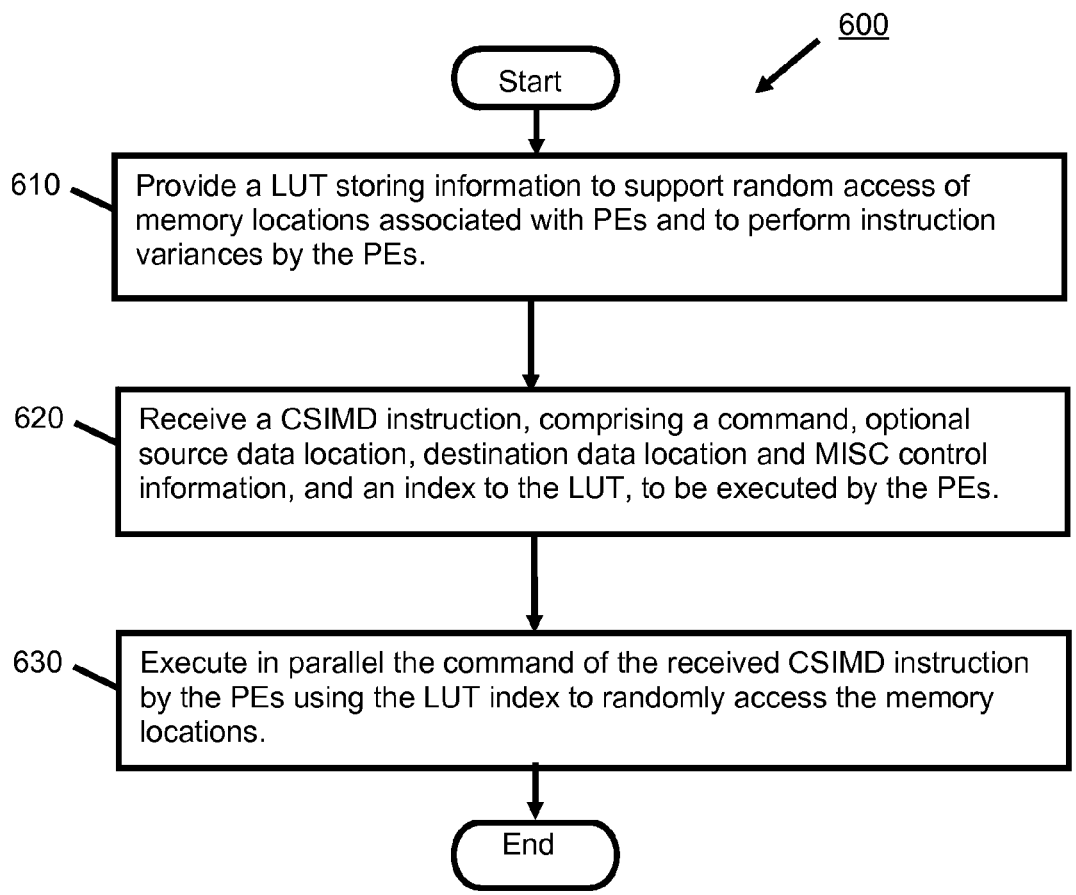
FIG. 6 is flow diagram illustrating a method of executing an instruction of FIG. 5 on the CSIMD unit of FIG. 4.

FIG. 6 illustrates a method 600 of processing a Configurable Single-Instruction-Multiple-Data (CSIMD) instruction. In step 610, a lookup table (LUT) is provided. The LUT stores information to support random access of memory locations (e.g., row and/or banks) associated with PEs and to perform instruction variances by the PEs. The memory locations may comprise row addresses and column banks (rows and columns). The information stored in the LUT depends on application needs. The information stored in the LUT may comprise instruction variances, random source data retrieval from the memory locations, and random destination data write-back to the memory locations. Data retrieval from and data write-back to memory locations is affected by specifying row and bank information. A LUT row pointed to by the LUT index further comprises information about at least some source data for the PEs to be read from respective memory locations associated with the PEs. A LUT row pointed to by the LUT index may comprise information about destination data for the PEs to be written to respective memory locations (e.g., banks) associated with the PEs. The LUT may comprise memory addresses in respective bank accessible using the LUT index to provide random access of source data stored in the memory locations.

In step 620, a CSIMD instruction is received. The instruction comprises a command and an index to the LUT and is to be executed by the PEs. The CSIMD instruction may optionally comprise source, destination and MISC control information. In step 630, the command of the received CSIMD instruction is executed in parallel by the PEs using the LUT index to randomly access the memory locations. The PEs perform instruction variances, random source data retrieval and random destination write back dependent on the LUT index and content.

How each PE executes may depend on the information obtained from LUT as well as CSIMD instruction. The CSIMD instruction may comprise the destination memory locations. At least one of the source and destination data locations, which can be row addresses and column banks, in the LUT may be provided to a random data access control (RDAC) unit. The RDAC unit may read data from the source data location and transfer the data to a respective PE. The RDAC unit may further transfer data from respective PEs and write to the destination data location. The method may further comprise the step of providing at least one of the PEs with MISC control information for executing dissimilar operation among PEs and processing the result of the executed command, the processing occurring before the results are written to the destination memory location.

3. Detailed Operation

Figure 7:
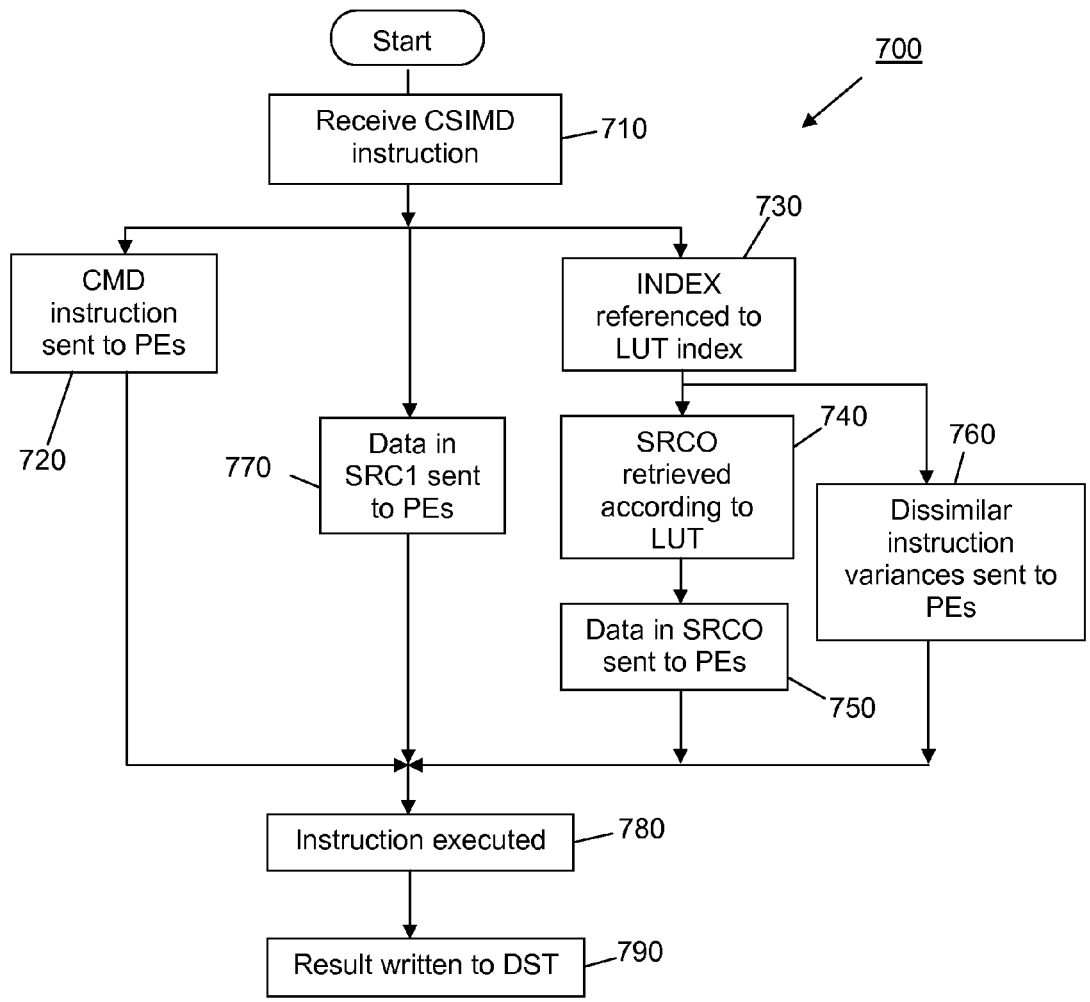
FIG. 7 is a flow diagram showing a detailed method of executing a CSIMD instruction on the CSIMD unit of FIG. 4.

FIG. 7 illustrates a method 700 of processing a Configurable Single-Instruction-Multiple-Data (CSIMD) instruction. The instruction is executed by the CSIMD unit 400 of FIG. 4. In step 710, a CSIMD instruction is received by the CSIMD unit 400. The instruction is typically parsed into the separate components for distribution to various components of the CSIMD unit. Following step 710, there are several parallel execution paths or branches between steps 710 and 780. In step 720 of one parallel branch, the CMD component of the instruction is sent to the PEs. Referring to the embodiment illustrated in FIG. 4, the CMD component is provided directly to PEs. Alternatively, each PE may independently receive the command instruction. Processing continues at step 780 from step 720.

In the parallel branch comprising steps 730, 740, and 750, in step 730, the INDEX component of the CSIMD is referenced to the LUT index. The INDEX is basically a number which is also the row number of LUT. For example, if the INDEX is 123, the information in 123th row of LUT is retrieved. That is, information in the INDEX component of the CSIMD instruction is used to access the appropriate row in the LUT. In step 740, the SRC0 data is retrieved according to the LUT. As shown in FIG. 4, the LUT 430 provides an address and bank of a first memory location in the memory block (SCR0). In step 750, source data in the SRC0 is sent to the PEs. SRC0 is accessed from the memory block according to the LUT. There are N addresses and N banks in the LUT, where N is a positive integer. Each address-bank pair is for one of the N PEs 410a-410n. In particular, the SCR0 addresses and banks are provided to the RDAC unit, which in turns accesses and reads the source data from SCR0 before providing the PEs with the respective data. Processing continues at step 780 from step 750.

From step 730, in step 760, dissimilar instruction variances can be provided to PEs. The accessed row of the LUT comprises miscellaneous (MISC) control information on how the PEs can execute differently. For example, the MISC control information can tell an individual PE how to handle the result of the command execution before writing the result to the memory block. For example, the MISC column in the LUT 430 may have N bits, each of which is passed to the PE 410. The data bit "1" indicates a specific operation is to be executed, while data bit "0" indicates another specific operation is to be executed. Processing continues at step 780.

In a further parallel branch between steps 710 and 780, in step 770, source data in the SRC1 component of the CSIMD instruction is sent to the PEs. In particular, the data in the SCR1 component is sent to the RDAC unit to retrieve data from a second memory address. The data in the second memory address is retrieved from its own memory bank, which is designated for the respective PE to which the data is subsequently provided. The data in the second memory addresses are then provided to the respective PEs. Processing continues at step 780.

In step 780, the instruction is executed. The PEs execute the command instruction on the first and second data sources. As mentioned hereinbefore, the MISC control information in the normal SIMD instruction is the instruction variance of the CMD component 510. For example, the ADD instruction can perform "SRC0+SRC1", or perform "|SRC0+SRC1|", or perform "(SRC0>>2)+SRC1", etc. In this case, all PEs run the same operation. The "MISC" column in the LUT 430 of FIG. 4 allows dissimilar instruction variances among PEs. For example, PE0-7 perform "(SRC0+SRC1)>>1", PE8-15 perform "SRC0+SRC1", etc.

In step 790, the result of instruction execution is written to DST location. The information from the DST component of the CSIMD instruction is provided to the RDAC unit 440 to control the destination data location, to which the result of the command operation is to be written. In this example, each PE writes to a memory address residing in the memory bank dedicated to the respective PE. The result of the command instruction is written to the respective destination addresses designated in the memory block. Processing then terminates.

Figure 8:
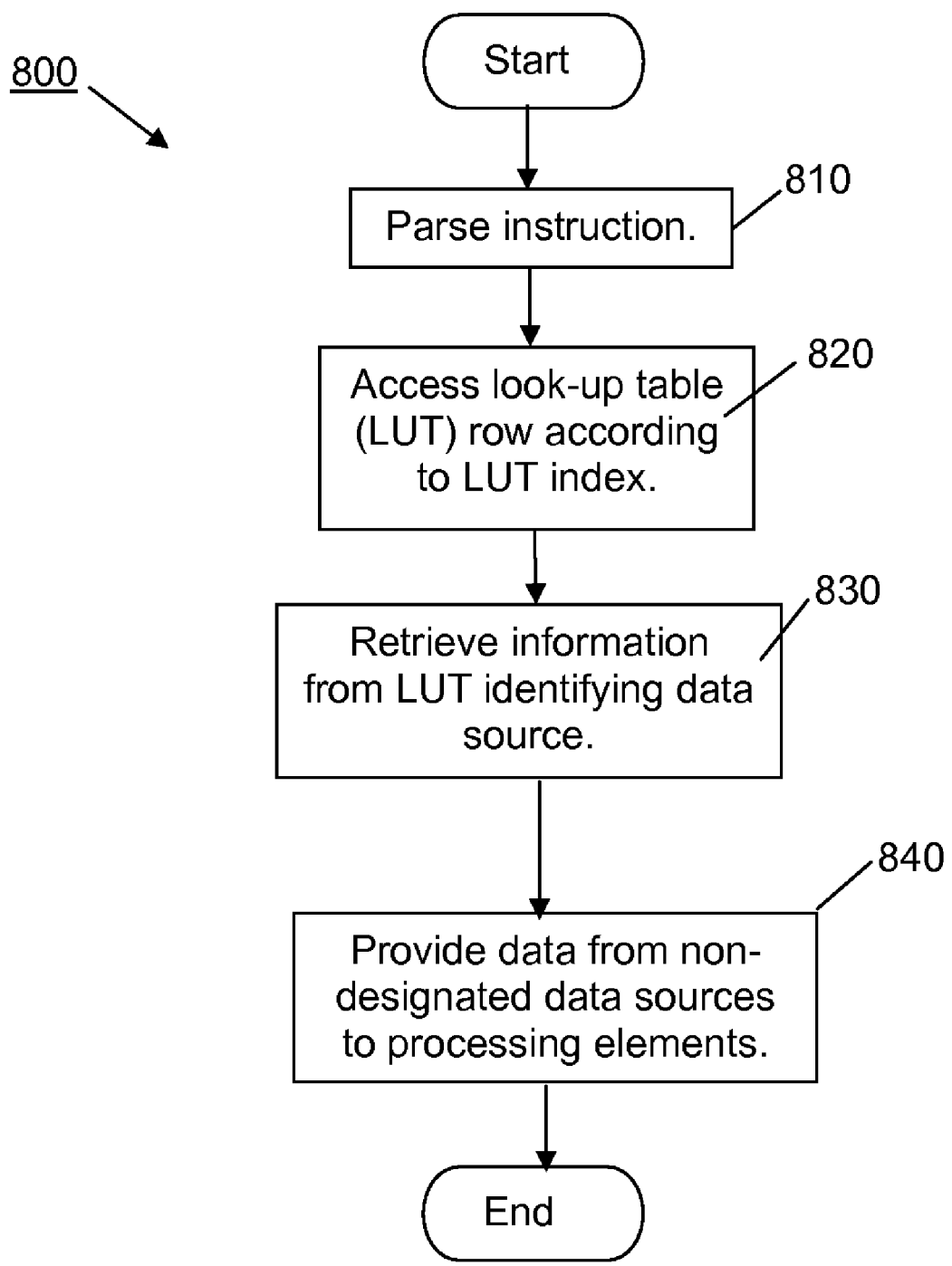
FIG. 8 is a flow diagram showing how data in a memory location is provided to a processing element of the CSIMD unit of FIG. 4.

FIG. 8 illustrates a method 800 of providing data in a memory location to a PE of a CSIMD unit. In step 810, an instruction received by a CSIMD unit is parsed into separate components. At least one of the parsed components is an INDEX corresponding to a reference in a LUT. The LUT INDEX indicates the row number from which the information in that row is retrieved. In step 820, a LUT row is accessed according to the LUT index. The LUT table row comprises information identifying at least one source data locations (SCR0, SRC1, etc.), which can be memory addresses and/or banks. In step 830, information identifying source data is retrieved from the LUT. In step 840, data from non-designated data sources is provided to the PEs. The data in the identified data source locations is provided to each of the PEs in the CSIMD unit. The data sources for each PE identified by the LUT are from memory locations that are not designated for the respective PEs. Processing then terminates.

With the use of a LUT 430, random reading of source data and random writing of results to any location of the memory block 420 is allowed. Also dissimilar instruction variances may be executed among PEs. There are no restrictions on the CSIMD instruction format and the LUT content. Further, the LUT content can be pre-defined, so that the LUT is configured once before the application starts or can be changed in the middle of the application, depending on the application requirements.

A small number of embodiments of the invention regarding methods and apparatuses for processing a Configurable Single-Instruction-Multiple-Data (CSIMD) instruction have been described. In the light of the foregoing, it will be apparent to those skilled in the art in the light of this disclosure that various modifications and/or substitutions may be made without departing from the scope and spirit of the invention.

The claims defining the invention are as follows:

1. A method of processing a Configurable Single-Instruction-Multiple-Data (CSIMD) instruction, said method comprising the steps of:
    creating a lookup table (LUT) including a plurality of rows which store LUT indexes associated with said rows and store information for a plurality of processing elements (PEs) to access memory locations in arbitrary order and to perform instruction variances, wherein said instruction variances allow PEs to perform different operations upon receiving a same instruction command;
    receiving a CSIMD instruction, said CSIMD instruction including a command and an index value to reference at least one of said LUT indexes in said lookup table (LUT), to be executed by said PEs; and
    executing in parallel differently said command of said received CSIMD instruction by said PEs using said LUT index to reference information used to access said memory locations in arbitrary order with the index value in said received CSIMD instruction.

2. The method according to claim 1, wherein said information stored in said LUT depends on application needs.

3. The method according to claim 1, wherein said information stored in said LUT comprises instruction variances, information for source data retrieval from said memory locations, and information for destination data write-back to said memory locations.

4. The method according to claim 3, wherein data retrieval from and data write-back to memory locations is effected by specifying address and bank information.

5. The method according to claim 3, wherein data retrieval from and data write-back to memory locations is effected by specifying row and bank information.

6. The method according to claim 1, wherein said PEs perform instruction variances, random source data retrieval and random destination write back according to said LUT index, wherein said instruction variances allow PEs perform different operations upon receiving a same instruction command.

7. The method according to claim 1, wherein a LUT row pointed to by said LUT index further comprises information about at least some source data for said PEs to be read from respective memory locations associated with said PEs.

8. The method according to claim 1, wherein a LUT row pointed to by said LUT index comprises information about destination data for said PEs to be written to respective memory locations associated with said PEs.

9. The method according to claim 1, further comprising the step of writing the results of each command executed by said PEs to respective destination memory locations.

10. The method according to claim 9, wherein said CSIMD instruction comprises said destination memory locations.

11. The method according to claim 1, wherein said LUT comprises memory addresses and banks in respective rows accessible using said LUT index to provide random access of source data stored in said memory locations.

12. The method according to claim 1, wherein at least one of said source and destination data addresses and banks in said LUT is provided to a random data access control (RDAC) unit.

13. The method according to claim 12, wherein said RDAC unit reads data from said data source location and transfers said data to a respective PE.

14. The method according to claim 12, wherein said RDAC unit transfers data from respective PEs and writes to said data destination location.

15. The method according to claim 1, further comprising the step of:
    providing at least one of said PEs with MISC control information in said LUT to allow each PE to execute the command differently.

16. The method according to claim 1, wherein the said memory locations comprise row addresses and column banks.

17. The method according to claim 1, wherein said CSIMD instruction further comprises one or more of source data locations, destination data locations and MISC control information.

18. An apparatus of processing a Configurable Single-Instruction-Multiple-Data (CSIMD) instruction, comprising:
    a plurality of processing elements (PEs);
    a lookup table (LUT) including a plurality of rows which store LUT indexes associated with said rows and store information for a plurality of processing elements (PEs) to access memory locations in arbitrary order and to perform instruction variances, wherein said instruction variances allow PEs perform different operations upon receiving a same instruction command;
    said PEs receiving a CSIMD instruction, including a command and an index value to reference at least one of said LUT indexes in said lookup table (LUT), to be executed by said PEs, and said PEs executing in parallel differently said command of said received CSIMD instruction using said LUT index to reference information used to access said memory locations in arbitrary order with the index value in said received CSIMD instruction.

19. The apparatus according to claim 18, wherein said information stored in said LUT depends on application needs.

20. The apparatus according to claim 18, wherein said information stored in said LUT comprises instruction variances, information for source data retrieval from said memory locations, and information for destination data write-back to said memory locations.

21. The apparatus according to claim 20, wherein data retrieval from and data write-back to memory locations is effected by specifying address and bank information.

22. The apparatus according to claim 20, wherein data retrieval from and data write-back to memory locations is effected by specifying row and column information.

23. The apparatus according to claim 18, wherein said PEs perform instruction variances, random source data retrieval and random destination write back dependent on said LUT index, wherein said instruction variances allow PEs perform different operations upon receiving a same instruction command.

24. The apparatus according to claim 18, wherein a LUT row pointed to by said LUT index further comprises information about at least some source data for said PEs to be read from respective memory locations associated with said PEs.

25. The apparatus according to claim 18, wherein a LUT row pointed to by said LUT index comprises information about destination data for said PEs to be written to respective memory locations associated with said PEs.

26. The apparatus according to claim 18, further comprising means for writing the results of each command executed by said PEs to respective destination memory locations.

27. The apparatus according to claim 26, wherein said CSIMD instruction comprises said destination memory locations.

28. The apparatus according to claim 18, wherein said LUT comprises memory addresses and banks in respective rows accessible using said LUT index to provide random access of source data stored in said memory locations.

29. The apparatus according to claim 18, further comprising a random data access control (RDAC) unit that is provided at least one of said data source and destination locations in said LUT.

30. The apparatus according to claim 29, wherein said RDAC unit reads data from said data source location and transfers said data to a respective PE.

31. The apparatus according to claim 29, wherein said RDAC unit transfers data from respective PEs and writes to said data destination location.

32. The apparatus according to claim 18, wherein at least one of said PEs is provided with MISC control information in the LUT to allow each PE to execute the command differently.

33. The apparatus according to claim 18, wherein the said memory locations comprise row addresses and column banks.

34. The apparatus according to claim 18, wherein said CSIMD instruction further comprises one or more of source data locations, destination data locations and MISC control information.

* * * * *